United States Patent
Kajino

[19]

[11] Patent Number: 6,155,373
[45] Date of Patent: Dec. 5, 2000

[54] FRAME STRUCTURE FOR INDUSTRIAL VEHICLE

[75] Inventor: Katsuo Kajino, Aichi-ken, Japan

[73] Assignee: Kabushiki Kaisha Toyoda Jidoshokki Seisakusho, Kariya, Japan

[21] Appl. No.: 09/296,900

[22] Filed: Apr. 22, 1999

[30] Foreign Application Priority Data

Apr. 22, 1998 [JP] Japan .................................. 10-112288

[51] Int. Cl.⁷ .................................................. B60K 7/00
[52] U.S. Cl. .......................................... 180/299; 180/311
[58] Field of Search .................................. 180/299, 298, 180/295, 311; 280/758, 759

[56] References Cited

U.S. PATENT DOCUMENTS

| | | | |
|---|---|---|---|
| 2,019,139 | 10/1935 | Kliesrath | 180/299 |
| 4,159,126 | 6/1979 | Raleigh | 180/299 |
| 4,449,606 | 5/1984 | Buschbom et al. | 180/299 |
| 4,821,827 | 4/1989 | Reese | 180/299 |

FOREIGN PATENT DOCUMENTS 10-167687   6/1998   Japan .

*Primary Examiner*—Kenneth R. Rice
*Attorney, Agent, or Firm*—Morgan & Finnegan, L.L.P.

[57] ABSTRACT

A frame structure is provided for an industrial vehicle to protect an engine from an external impact as well as to facilitate a maintenance workability with respect to the engine. In the frame structure for the industrial vehicle, a planar base plate is provided, which is connected to rear portions of side frames elongated in parallel to a front-to-rear direction and which is elongated rearwardly, so that a vertical load acting on a rear axle is received by the base plate. An engine is mounted on the base plate, and the rear end portion of the base plate is connected to the rear end upper portions of the side frames through a rear member constructed by rod-like members and disposed to surround the rear surface and side surfaces of the engine. The vibrations of the engine is absorbed by the elastic deflection of the base plate and the elastic deformation of the rear tires.

8 Claims, 5 Drawing Sheets

FRAME STRUCTURE FOR INDUSTRIAL VEHICLE

BACKGROUND OF THE INVENTION

1. Field of the Invention

The present invention relates to a frame structure for an industrial vehicle, such as a forklift, which is used for loading/unloading work.

2. Description of the Related Art

As shown in FIG. 5, a conventionally typical forklift includes a loading/unloading device 32 on the front portion of a vehicle body 31, a seat 33 on the front side upper portion of the vehicle body 31, and a counter-weight 34 on the rear side of the vehicle body 31 to enhance the stabilization of the vehicle in the front-to-rear direction. An engine room is defined in a space between left and right side frames constructing strength members of the vehicle body 31, and an engine 35 is mounted to the engine room through an engine mount (not shown) having a vibration-absorbing function. The upper portion of the engine room is covered by an engine hood 36 on which the seat 33 is installed.

The conventional frame structure thus constructed is effective in view of the protection of the engine 35 from the externally-applied impact due to a collision or the Like since the engine disposed within the engine room is surrounded and covered by stationary members entirely with the exception of the engine hood 36.

On the other hand, in view of the maintenance work for the engine and peripheral equipments associated therewith, it is pointed out that the maintenance space is small and the workability of the maintenance work is poor since the space through which the engine and the peripheral parts can be accessed is limited only to the upper opening portion of the engine room opened by the engine hood 36.

SUMMARY OF THE INVENTION

The present invention has been made in view of the above-noted problems, and an object of the present invention is to provide a frame structure for an industrial vehicle, which can protect an engine from an external impact and facilitate a maintenance workability with respect to the engine.

To attain the stated object, a frame structure for an industrial vehicle according to the present invention is designed to include: a pair of side frames elongated in parallel to each other in a front-to-rear direction of the vehicle; a prolonged member supported by rear portions of the side frames, elongated rearwardly to the vehicle and adapted to mount an engine thereon; and a rear member disposed to surround a rear surface and side surfaces of the engine, said rear member being supported by a rear end portion of the prolonged member and rear end upper portions of the side frames.

In the frame structure of the present invention thus constructed, the engine mounted on the prolonged member is surrounded at its rear surface and side surfaces simply by the rear member constructed by the rod-like member. Therefore, it is possible to prepare a wide maintenance space for the maintenance work such as an inspection for the engine and components associated therewith. That is, the maintenance work can be performed not only from the upper portion of the vehicle but also from the right and left side portions and the rear portion. Thus, the workability can be improved remarkably.

Since the prolonged member is connected to the side frames through the rear member surrounding the engine, it is possible to assure the required frame strength, thereby protecting the engine from the externally applied impact caused by a collision or the like.

DESCRIPTION OF THE PREFERRED EMBODIMENTS

A preferred embodiment of the present invention will now be described with reference to the drawings.

Figure 1:
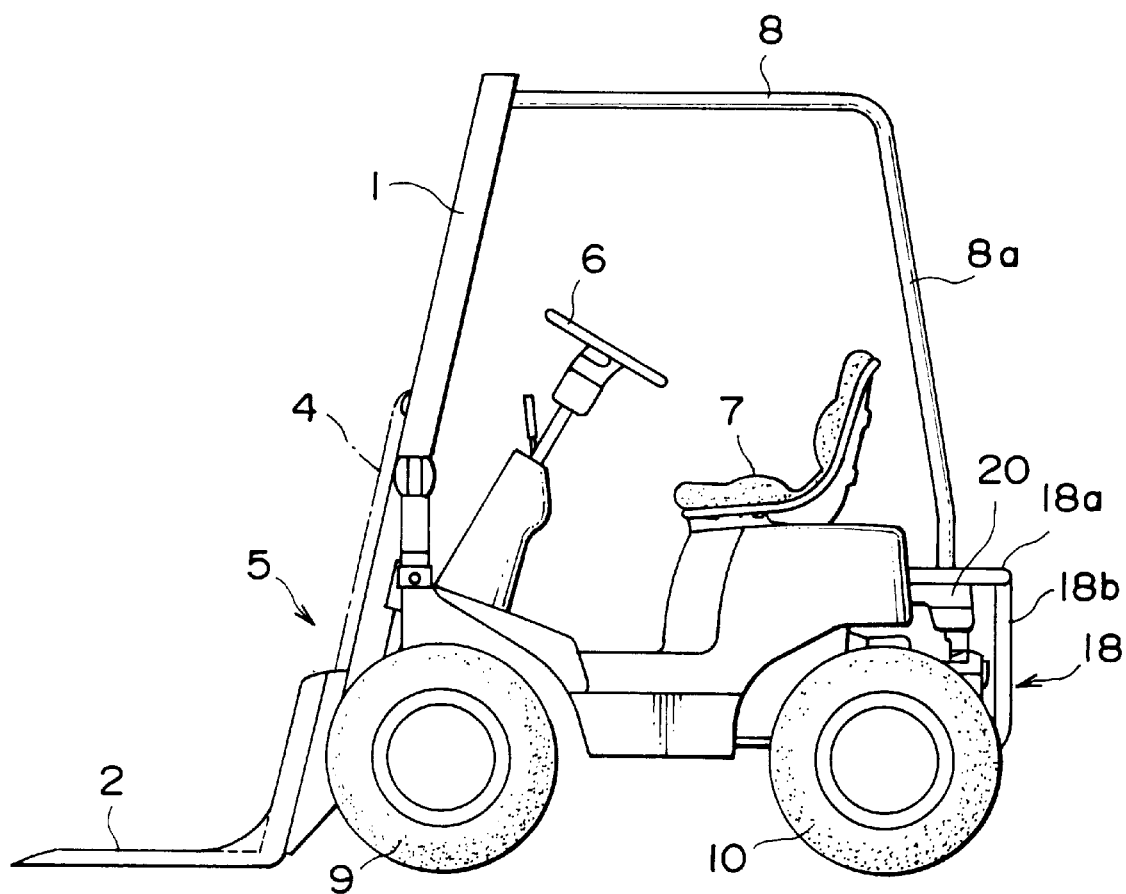
FIG. 1 is a side view showing a forklift provided with a frame structure according to an embodiment of the present invention.
Figure 2:
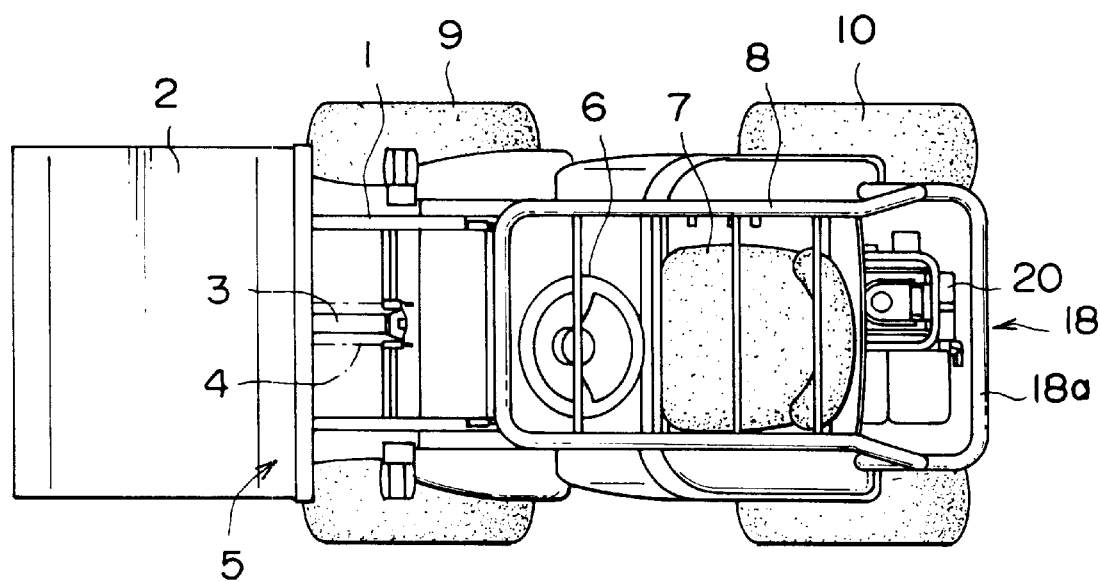
FIG. 2 is a plan view showing the forklift provided with the frame structure according to the embodiment.

This embodiment of the present invention is directed to a light-weight and small-size forklift which is used for the loading/unloading work the loading weight of which is about 200–300 kg. As shown in FIGS. 1 and 2, the forklift is provided, on the front portion of the vehicle body, with a loading/unloading device 5 which includes a mast 1, a pallet fork 2 mounted on the mast 1 movably in a vertical direction, a lift cylinder 3 and a lift chain 4 for vertically driving the pallet fork 2, and so on. The forklift is further provided, on the vehicle body, with a handle 6 for steering operation, a seat 7, and a head guard 8 for protecting a driver. In FIGS. 1 and 2, reference numeral 9 designates a front wheel, and reference numeral 10 designates a rear wheel.

Figure 3:
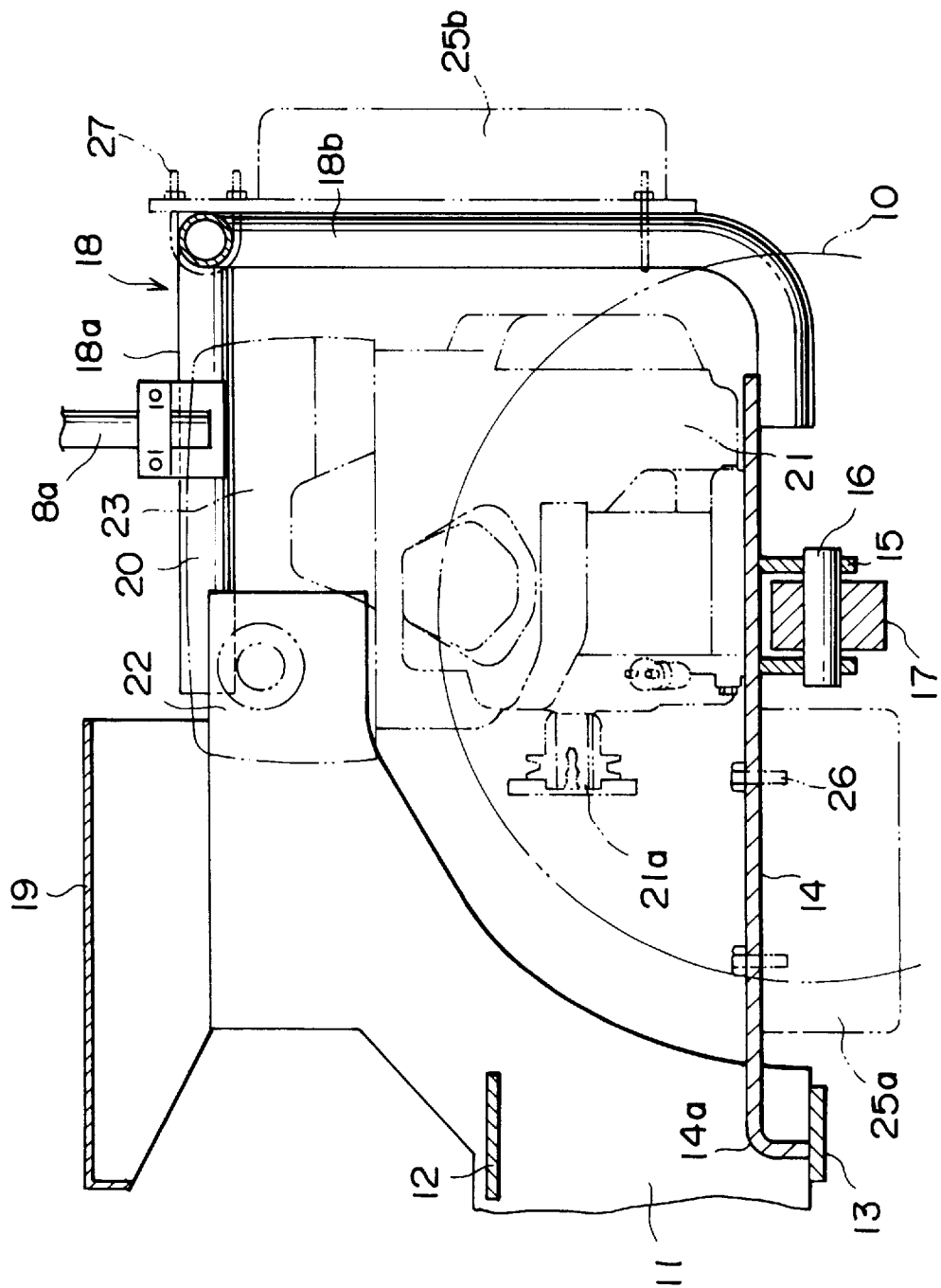
FIG. 3 is a sectional view showing the frame structure according to the embodiment as viewed laterally.
Figure 4:
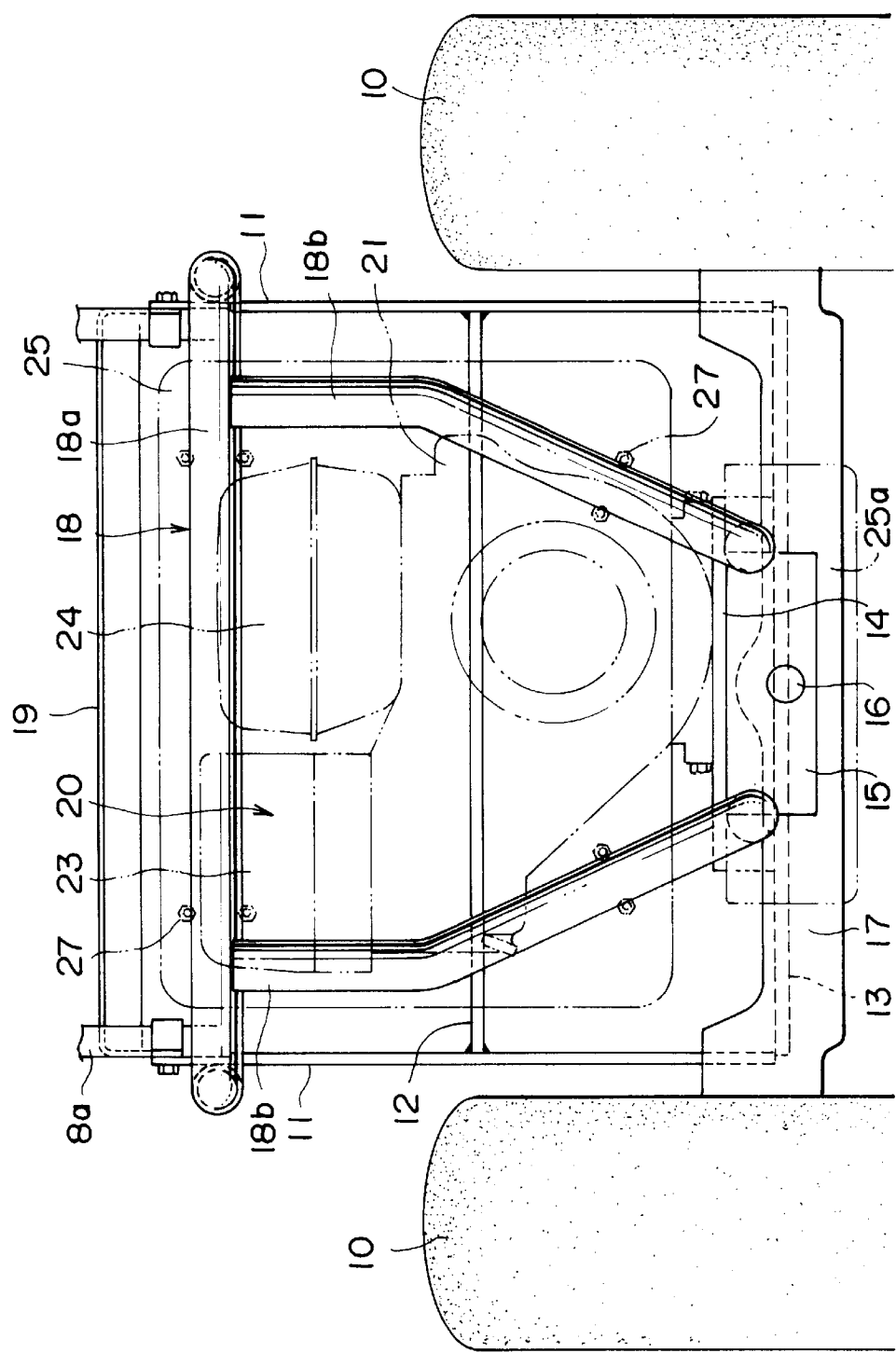
FIG. 4 is a rear view showing the frame structure according to the embodiment.
Figure 5:
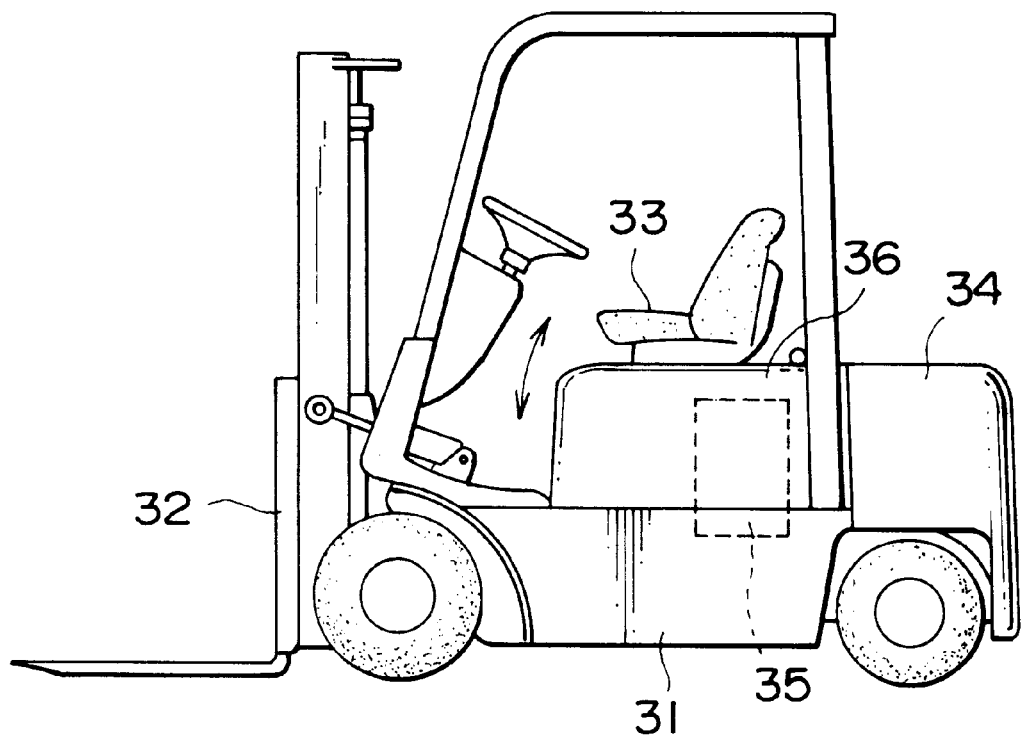
FIG. 5 is a side view showing a conventional forklift.

With reference to FIGS. 3 and 4, a frame structure for the vehicle according to this embodiment, in particular,, a rear frame structure on which an engine and its associated equipments are mounted will be described. As illustrated, left and right side frames 11, which are elongated in parallel in the front-to-rear direction to constitute major strength members of the frame, are formed by plates disposed vertically, and these side frames 11 are connected to each other through a middle upper member 12 and a middle lower member 13 which are welded to the frames 11 and elongated in the vehicle width direction.

A base plate 14 is disposed on the rear lower portion of the side frame 11 to form a prolonged member elongated horizontally and rearwardly therefrom. The base plate 14 is formed of a rectangular planar steel plate lengthened in the front-to-rear direction so that the base plate 14 possesses the flexibility. The front end portion of the base plate 14 is bent downwardly to form the bent portion 14a the end portion of which is welded and connected to the upper surface of the middle lower member 13. This arrangement further enhances the flexibility of the base plate 14.

An axle bracket 15 is provided on the lower surface of the base plate 14 at its central portion in the vehicle width direction. A rear axle 17 is mounted rotatably about a horizontal axis to the axle bracket 15 through a center pin 16. That is, the base plate 14 is designed to receive the vertical load acting on the rear axle 17. The rear wheels 10 steerable by the handle 6 are mounted on the axial end portions of the rear axle 17, respectively. A balloon tire is used as each of the rear wheels 10.

An engine 20 is mounted on the upper surface of the base plate 14 as shown by two-dotted chain line in FIG. 3. A rear member 18 is disposed around the side surfaces and rear surface of the engine 20 as a strength member constructed by rod members made of circular pipes. That is, the rear member 18 in this embodiment serves also as a guard member for protecting the engine, which is constructed by a rear cross member 18a substantially in the form of a U-shape that is disposed substantially horizontally so as to surround the upper left side, upper right side and the rear surface of the engine 20, and two rear vertical members 18b disposed substantially vertically with respect to the rear surface of the engine.

The rear cross member 18a is welded at its right and left end portions to the upper and outer surface of the right and left side frames 11 so as to receive the horizontal load. The rear vertical member 18b is welded at its upper end to the rear cross member 18a and at its lower end to the rear end portion, i.e. the free end of the base plate 14, so as to receive the vertical load. This arrangement ensures the required strength and rigidity of the frame rear portion.

As shown in FIGS. 1 and 2, the rear member 18 thus constructed is connected to the right and left rear pillars 8a of the head guard 8 at the right and left sides of the rear cross member 18a, so as to reinforce the frame strength.

Each of the right and left side frames 11 is arcuately elongated obliquely upwardly at its rear end so as to avoid the interference with the rear wheels 10. A seat plate 10 is laterally connected between the elongated upper end portions of the frames 11 so that the seat 7 is placed thereon.

As shown by two-dotted chain lines in FIGS. 3 and 4, the engine 20 in this embodiment is constructed such that the peripheral components, such as a carburetor 22, a muffler 23, a fuel tank 24 and so on are integrally assembled to an engine main body 21. The engine main body 21 is directly mounted on the upper planar surface of the base plate 14 and fixed thereto by bolts. The power of the engine 20 is transmitted from a not-shown propeller shaft, that is connected to an output shaft 21a of the engine 20 via a joint, to the front wheels 7 through a differential device and a front axle.

As shown by the two-dotted chain lines in FIGS. 3 and 4, sub-weights 25a and 25b can be mounted to the lower surface of the base plate 14 in front of the rear axle 17 and the rear surface of the rear member 18, respectively, so as to enhance the front-to-rear stability of the vehicle.

That is, the lower surface of the base plate 14 has a sufficient installation space where the sub-weight 25a can be mounted. The sub-weight 25a can be fastened in place with bolts 26. At the rear surface of the rear member 18, there is formed a substantially U-shaped vertical surface defined by the rear cross member 18a and the rear vertical members 18b. The sub-weight 25b is disposed along this vertical surface, and can be fastened and fixed thereto in a suspended manner with U-bolts 27.

As described above, the frame structure according to this embodiment is designed such that the engine 20 is mounted on the upper surface of the base plate 14 that is elongated rearwardly from the rear portions of the side frames 11 and that receives the vertical load acting on the rear axle 17, and further the engine 20 is surrounded by the rear member 18 constructed by rod-like strength members. Therefore, the engine 20 and its peripheral components can be protected by the rear member 18 from the external impact due to a collision, and the maintenance space can be formed at not only the upper portion but also side and rear portions of the engine.

That is, according to the present embodiment, most of the engine 20 and peripheral components associated thereto are exposed externally, so that the maintenance space is significantly enlarged in comparison with the conventional arrangement. Thus, it is possible to facilitate the maintenance work such as an inspection.

Further, in the present embodiment, since the base plate 14 is constructed by the rectangular steel plate to provide the flexibility and since the balloon tire is used as each of the rear wheels 10, the vibrations of the engine 20 can be absorbed using the elastic deflection (the deflection within the elastic limit) of the base plate 14 and the elastic deformation of the rear wheel tires 10.

This arrangement can prevent the vibrations of the engine 20 from being transmitted to the frame side, i.e. the side frames 11 and rear member 18 or can reduce the same. In particular, according to the present embodiment, the bent portion 14a is provided at the connecting part of the base plate 14 to the middle lower member 13, thereby facilitating the base plate 14 to be bent in comparison with the case where these members are simply stuck vertically and connected to each other through the plane contact, and thus the vibration absorbing effect can be improved.

Owing to the above-noted arrangement, the engine 20 can be directly mounted to the plane of the base plate 14 without using the engine mount, and consequently the mounting or replacement of the engine 20 can be easily performed. Particularly, even if the engine is required to be replaced with another type of engine, this replacement can be easily done simply by changing the fastening or fixing portions (i.e. through holes for fastening or fixing bolts are simply formed through the base plate 14 so as to conform with the engine to be mounted).

Further, the engine mount having the vibration absorbing characteristic can be dispensed with. In other words, the engine bracket, the mount bracket, insulator rubber and so on can be dispensed with, thereby actualizing the simple structure and cost reduction associated with the reduction of the number of parts.

In the present embodiment, since the engine 20 is located right above the rear axle 17 at the rear portion of the vehicle, the engine 20 also fulfils the function as the counterweight that enhances the front-to-rear stability of the vehicle. Paying attention to the case where the weight of the engine 20 is insufficient to achieve this purpose, the base plate 14 and the rear member 18 are provided with spaces where the sub-weights 25a and 25b can be installed. Therefore, depending on the size of the vehicle and the weight of the loading/unloading device 3 to be mounted to the front portion of the vehicle (the presence/absence of the additional attachment device), and so on, the adjustment can be performed to make the front-to-rear stability appropriate.

In addition, the present invention should not be limited to the aforementioned embodiment, and can be modified as desired without departing from the spirit of the invention.

Although the base plate 14 is fixed at its both ends in the present embodiment, an arrangement in which one end is fixed and the other end is made movable to facilitate the flexibility is applicable. As an example of this arrangement, the movable end portion of the base plate 14 may be vertically supported by not-shown brackets so as to be slidable in the longitudinal direction.

Although the base plate 14 is made of the rectangular, planar iron plate to have the flexibility, it may be constructed by a high rigidity member such as a shaped steel and the engine 20 may be mounted thereto through an engine mount having the vibration preventing function.

The rear member 18 is made of circular pipes, but the invention should not be restricted thereto. The rear member 18 may be made of any rod-like members irrespective of the cross-sectional shape, and whether it is hollow or solid. Although the present embodiment is described with reference to an example of the forklift, the present invention can be applied to any vehicles as long as the loading/unloading device is provided on the front side of the vehicle body irrespective of the type of the loading/unloading device.

Moreover, although the vertical load acting on the rear axle 17 is received by the base plate 14 in this embodiment, it may be received by side frames 11 or the rear member 18 which is made of a rigid material.

As described above in detail, according to the present invention, it is possible to protect the engine from the external impact as well as to facilitate the maintenance work for the engine and components associated thereto.

What is claimed is:

1. A frame structure for an industrial vehicle, comprising:
   a pair of side frames elongated in parallel to each other in a front-to-rear direction of the vehicle;
   a middle upper member and a middle lower member, each connecting rear portions of said pair of side frames to each other;
   a prolonged member supported by rear portions of the side frames, elongated rearwardly to the vehicle and adapted to mount an engine thereon, and a front end portion of said prolonged member being fixed to said middle lower member and a rear end portion of said prolonged member being fixed to said rear member; and
   a rear member disposed to surround a rear surface and side surfaces of the engine, said rear member being supported by said rear end portion of said prolonged member and rear end upper portions of said side frames.

2. The frame structure for the industrial vehicle as set forth in claim 1, wherein said rear member comprising:
   a substantially U-shaped rear cross member surrounding the right and left side surfaces and the rear surface of the engine; and
   two rear vertical members connected to the rear cross member and disposed substantially vertically at the rear of the engine.

3. The frame structure for the industrial vehicle as set forth in claim 1, wherein a front end portion of said prolonged member has a bent portion bent downwardly, a distal end of the bent portion being connected to said middle lower member.

4. The frame structure for the industrial vehicle as set forth in claim 1, wherein a sub-weight is mounted on at least one of said prolonged member and said rear member so as to enhance a front-to-rear stability of the vehicle.

5. The frame structure for the industrial vehicle as set forth in claim 1, wherein said prolonged member is composed of a planar base plate.

6. The frame structure for the industrial vehicle as set forth in claim 1, wherein said prolonged member is formed of a shaped steel.

7. The frame structure for the industrial vehicle as set forth in claim 1, wherein said prolonged member supports a rear axle.

8. The frame structure for the industrial vehicle, comprising:
   a pair of side frames elongated in parallel to each other in a front-to-rear direction of the vehicle;
   a prolonged member supported by rear portions of the side frames, elongated rearwardly to the vehicle and adapted to mount an engine thereon;
   a rear member disposed to surround a rear surface and side surfaces of the engine, said rear member being supported by a rear end portion of said prolonged member and rear end upper portions of said side frames; and
   a sub-weight mounted on at least one of said prolonged member and said rear member so as to enhance a front-to-rear stability of the vehicle.

* * * * *